H. L. BAKER ET AL

June 13, 1933. WAGON HITCH Re. 18,868

Original Filed Oct. 17, 1930

Inventors
Hiram L. Baker
Mervin R. Baker
By Gillson, Manu & Gittys.

Reissued June 13, 1933 Re. 18,868

UNITED STATES PATENT OFFICE

HIRAM L. BAKER AND MERVIN R. BAKER, OF LELAND, ILLINOIS, ASSIGNORS TO DEERE & COMPANY, OF MOLINE, ILLINOIS, A CORPORATION OF ILLINOIS

WAGON HITCH

Original No. 1,821,917, dated September 8, 1931, Serial No. 489,246, filed October 17, 1930. Application for reissue filed December 26, 1931. Serial No. 583,412.

This invention relates to wagon hitches and more particularly to the adjustable type.

One object of the invention is the provision of a new and improved wagon hitch having novel means for adjusting the same for adjusting the wagon attached thereto to a greater or less distance from the hitch bar.

A further object of the invention is the provision of a new and improved wagon hitch having means for adjusting the position of the wagon relative to the operating mechanism without stopping the forward movement of the tractor means.

Another object of the invention is the provision of a new and improved wagon hitch having extensible means for varying the distance between the wagon being drawn and the hitch bar, together with novel means for automatically retracting the extensible means when the same is released.

Still another object of the invention is to provide such extensible means and controlling mechanism therefor on the draft connections between the tractor and the wagon rather than on the tractor.

Another object of the present invention is the provision of novel controlling mechanism in the form of brake means or frictionally engaging elements cooperating with the extensible means whereby adjustment can be made by merely disengaging the friction elements without any further exertion on the part of the operator.

A still further object of the present invention is the provision of such frictionally engaging elements for transmitting draft to the wagon that slight slippage occurs during the acceleration of the wagon up to the speed of the tractor.

A further object of the invention is the provision of a new and improved wagon hitch that is simple in construction, inexpensive to manufacture, efficient in operation, that may be readily assembled, and that is not likely to become broken or get out of order.

Other and further objects and advantages of the invention will appear from the following description taken in connection with the accompanying drawing, in which—

Figure 1:
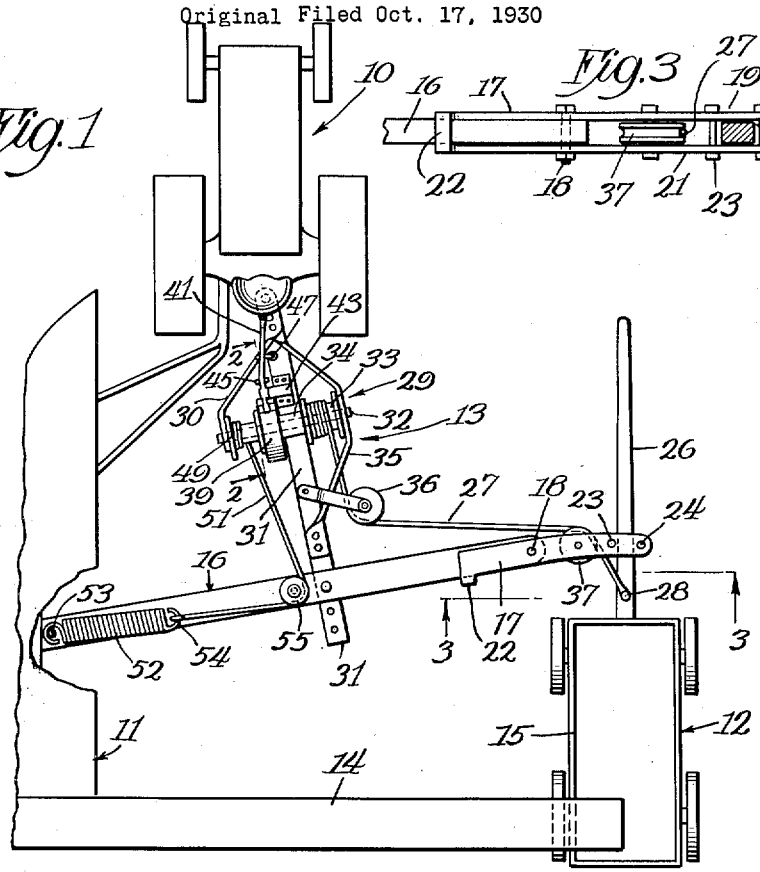
Fig. 1 is a plan view of the device as applied to a tractor and corn gathering mechanism showing the device on a somewhat enlarged scale relative to the tractor and the wagon.

Referring now to the drawing, the reference character 10 designates generally a tractor, 11 the corn harvester mechanism, and 12 a wagon, all of which are of the usual or any well-known construction, these devices being shown more or less diagrammatically and on a smaller scale than the hitch mechanism which is designated generally by the reference character 13.

The gathering mechanism 11 is provided with a more or less conventional draft transmitting structure connected at its forward end with the tractor 10 and at its rear end connected with or forming a part of the implement or machine 11. The harvester 11 is also provided with the usual conveyor 14 for transferring the gathered corn or husked ears from the mechanism 11 to a suitable receptacle such as the wagon body 15 of the wagon 12. In gathering corn it is necessary to provide means for receiving the corn as it is gathered. A wagon is universally employed for this purpose, and in loading the wagon it is necessary that it be moved relative to the conveyor 14 so that the load may be properly distributed within the wagon body.

It is common practice to provide a wagon hitch comprising a hitch bar and a cable with means for attaching one end of the cable to the wagon and the other end in such a manner that the cable may be extended or retracted in order that the wagon may be moved relative to the conveyor 14. It is necessary, however, to stop the tractor when the adjustment of the cable is to be made. This of course is objectionable because of the loss of time in making the adjustment.

The present invention seeks to remedy this difficulty by the provision of a hitching device having extensible means that may be operated without stopping the tractor for adjusting the wagon relative to the conveyor. In the form of construction shown, the reference character 16 designates a hitch bar, the inner end of which is connected to the corn gathering mechanism and its outer end is provided with an extension 17 hinged as at 18 to the outer end of the bar 16. This extension may be of any suitable form, that disclosed being the form of a pair of bars 19 and 21 connected together at their inner ends by the tie member 22.

The tie member 22 is adapted to engage the rear side of the bar 16 and limit the rearward movement of the outer end of the extension 17. The outer ends of the bars 19 and 21 are provided with aligned openings through which suitable bolts 23 and 24 are adapted to extend. These bolts are spaced apart to form a guide 25 for the tongue 26 of the wagon 12.

The extension 17 is pivoted as at 18 in order that the tongue may be more readily placed in position in the guide 25.

In placing the tongue in position in said guide, it is placed alongside the end of the bar 16, the outer end of the extension 17 is moved forwardly, the outer bolt 24 is removed, after which the tongue is raised to position and the outer end of the extension 17 moved rearwardly for engaging the top and bottom of the tongue, after which the bolt 24 is replaced.

An extensible member, such as the traction cable 27 is provided for connecting the wagon to the wagon hitch for drawing the wagon along with the hitch and the tractor. The outer end of the cable 27 is provided with a suitable loop through which the double-tree pin 28 may extend as is usual in such constructions.

Suitable means are provided for anchoring the inner end of the cable 27 and for extending said cable when it is desired that the wagon 12 be moved relative to the conveyor 14. In the form of construction shown, a winding and control mechanism 29 is employed for this purpose.

This mechanism is mounted on a drawbar 31 which is connected at its forward end to the tractor at a point spaced from the point of attachment of the draft structure between the tractor 10 and the harvester 11, and at its rear end the drawbar 31 is connected to an intermediate portion of the hitch bar 16. This mechanism comprises a shaft 32 to which is rigidly connected the winding drum 33. The shaft 32 is journaled in a bearing 34 on the drawbar 31 and at its outer end is journaled in a support 35 which in turn has its end portions bent laterally and rigidly connected to the drawbar 31. The inner end of the shaft 32 is journaled in a supporting arm 30 rigidly connected to the drawbar 31. The cable 27 has its inner or forward end anchored to the drum 33 and is wound on said drum.

Figure 3:
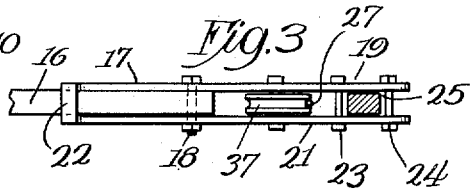
Fig. 3 is a section on line 3—3 of Fig. 1.

The cable 27 extends about suitable guide pulleys 36 and 37, the latter being mounted in the extension 17 as clearly shown in Figs. 1 and 3 of the drawing.

Means are also provided for controlling the rotation of the drum 33 when it is desired to change the relation of the wagon 12 to the conveyor 14. Any suitable mechanism may be employed for this purpose. In the form of construction selected to illustrate one embodiment of the invention this means comprises a brake drum 38 keyed to the shaft 32 and provided with a brake band 39 for frictionally engaging the drum 38. A brake lever 41 fulcrumed as at 42 on a standard 43 on the drawbar 31 has its outer end connected to one end of the brake band 39 as at 44 and has its opposite end extending within convenient reach of the driver of the tractor, to be operated.

Figure 2:
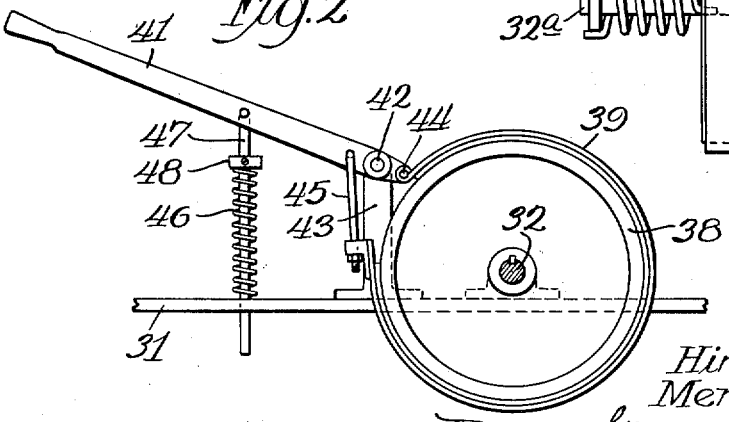
Fig. 2 is a section on line 2—2 of Fig. 1.

The opposite end of the brake band 39 is connected to the lever 41 between its outer end and the fulcrum 42 by an adjustable link 45, as shown in Fig. 2 of the drawing.

The brake band 39 is held in brake drum engaging position by any appropriate mechanism. In the construction shown, it is resiliently held in position for gripping the brake drum by a spring 46 mounted on a rod 47, one end of which is pivotally connected to the lever 41 and its other end slidably extending through an opening in the drawbar 31. A collar 48 is adjustably mounted on the rod 47 for constituting an adjustable abutment for the upper end of the spring.

In the operation of the device, when the conveyor 14 has filled the rear end of the wagon body, the operator presses down on the lever 41 which will permit the wagon to lag behind the tractor, and when the wagon reaches the desired position the operator releases the lever 41 and the spring 46 causes the band 39 to grip the drum 38 and hold the cable 27 from further movement. This is repeated until the entire wagon body has been filled. The frictionally engaging elements 38 and 39, however, permit a slight slippage during the acceleration of the wagon up to the speed of the tractor, particularly when the wagon is well loaded. By reason of this shock-absorbing characteristic the shock of picking up the load after it has been momentarily disconnected from the tractor to adjust its relative position does not throw undue strains in the parts of the hitch device.

It is desirable that appropriate means be provided for automatically rewinding the cable when the tension on the same is released. This tension may be released either by releasing the end of the cable from the pin 28 or it may be released by moving the tractor backward relative to the wagon. Any suitable mechanism may be employed for this purpose. In the form of construction shown in Fig. 1, which is by way of example only, the inner end of the shaft 32 has keyed thereto a drum 49 which is considerably smaller in diameter than the drum 33.

A retracting cable 51 is anchored to the drum 49 and is adapted to be wound thereon in the opposite direction from the cable 27 on the drum 33. The outer end of the cable is connected to a suitable spring 52 which is suitably anchored at its outer end as at 53 and is connected at its inner end to the cable 51 as at 54. A suitable guide such as the pulley 55 is provided for changing the direction of the pull on the cable 51.

In the operation of the device when the drum 38 is released and the cable 27 is paid out the rotation of the drum 33 for unwinding the cable 27 will rotate the drum 49 for winding the cable 51 thereon, thereby tensioning the spring 52. When, for any reason, it is desired to advance the wagon relative to the tractor, the tractor is moved rearwardly, the lever 41 is operated to release the brake band, and the spring 52 will take up the slack. When it is desired to release the wagon, it is only necessary to move the tractor rearwardly slightly for relieving the tension on the cable 27, and after the cable has been released the lever may be operated to release the brake band, whereby the spring 52 will cause the cable to be wound on the drum 33.

Figure 4:
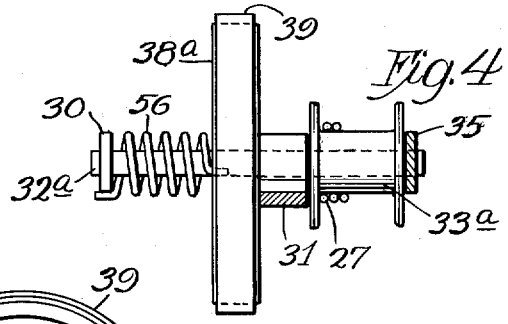
Fig. 4 shows a modified form of the rewinding mechanism.

The form of construction shown in Fig. 4 differs from that just described in that a different form of retracting mechanism is employed. In this form of construction a torsion spring 56 having one end anchored to the brake drum 38*a* and its opposite end anchored to the brace member 30 is mounted on the shaft 32*a* and is adapted to be wound up or placed under torsion when the traction cable 27 is unwound therefrom, whereby when the tension on the cable is released the torsion of the spring 56 will rewind the same on the drum 33*a*.

We claim as our invention:

1. In a device of the class described, a wagon hitch bar, a pulley on one end thereof, a drawbar having its rear end connected to said hitch bar, differential winding mechanism mounted on said drawbar and comprising a brake drum and a pair of winding drums of different diameters, a traction cable having one end wound in one direction on one of said winding drums and having its other end extending about said pulley, a cable wound in an opposite direction about the other winding drum, and a spring having one end anchored and its other end connected to said last-named cable, and means for holding said brake drum in adjusted position.

2. In a wagon hitch, a hitch bar having one end connected to a farm implement, a drawbar secured to said hitch bar between the ends thereof, a winding drum, means for mounting said drum on said draw bar, a cable attached to said drum and adapted to be wound thereon, guide means on the outer end of said hitch bar around which said cable extends, the free end of said cable being adapted to be attached to a vehicle for drawing the same, means for adjustably holding said drum at any angularly adjusted position, and means for normally maintaining said drum in position with said cable wound thereon.

3. In a wagon hitch for corn harvester mechanism, a hitch bar adapted to be connected at one end to said mechanism and to extend laterally therefrom, a draw bar connected to an intermediate portion of said hitch bar and extending forwardly therefrom and adapted to be attached to means for propelling said harvester mechanism, a winding drum, means for mounting said drum, a traction cable secured to said drum and adapted to be wound thereon, a guide around which said cable is adapted to extend for connecting the same to a wagon, yielding means tending to maintain said cable wound on said drum, and means for holding said drum in adjusted position.

4. In a wagon hitch, a hitch bar, a guide in the outer end of said bar, a draw bar connected to an intermediate portion of said hitch bar, a winding drum mounted between the ends of said bar, a cable attached to said drum and extending through said guide, wagon attaching means on the free end of said cable, means including a resilient element for normally maintaining said cable wound on said drum, and means for holding said drum in adjusted position.

5. A wagon hitch comprising mechanism for attaching a harvester to a transporting device, and including means for transporting a wagon, a shaft associated with said mechanism, a pair of drums of unequal diameter mounted on and rotatable with said shaft, a cable for each drum, said cables being wound in opposite directions on said drum, one of said cables being adapted to be attached to a wagon for drawing the same, a spring attached to the other cable for normally tensioning the same for rotating said drum in a direction for winding said first named cable on its respective drum when said wagon is released or when slack is created between said wagon and transporting device, a brake drum, a brake band on said drum, a lever for tightening said band on its cooperating drum, and resilient means for normally moving said lever into band tightening position.

6. In combination, a tractor, an agricultural machine, a wagon, means for drawing said machine and wagon by said tractor, said means comprising a hitch bar having one end connected to said machine, a draw bar having its forward end detachably connected to said tractor and its rear end detachably connected to said hitch bar at a substantial distance from both ends, a conveyor carried by said machine and adapted to transfer material from said machine to said wagon, means including a member engaging said hitch bar and wagon for changing the relative positions of said conveyor and wagon for loading different portions of said wagon, said last named means being operative during the continued movement of said tractor and including a lever accessible to the operator on said tractor.

7. In a wagon hitch mechanism a pair of winding drums, a brake drum, a common shaft for all said drums, a cable for each winding drum so attached that when one is wound on its respective drum the other will be unwound from the drum to which it is attached, a spring attached to the free end of the cable on one drum, means on the free end of the other cable for attachment to a wagon, a brake band, means for causing said brake band to automatically grip said brake drum, and a lever for manually releasing said brake band.

8. In a wagon hitch, a tractor, a drawbar connected thereto and extending rearwardly therefrom, a hitch bar having an intermediate portion connected with said drawbar, said hitch bar having a pivoted guide member at its outer end, a guide pulley carried by said member, a wagon having its tongue extending through said guide, a winding drum, a cable attached to said drum, and extending about said pulley, means on the end of said cable for connecting the same to a wagon, means including a spring element for resiliently resisting the unwinding of said cable, and means for holding said drum in adjusted position.

9. A draft connection between a tractor and an agricultural implement and a wagon disposed at one side thereof, comprising means connecting the tractor with the implement, a generally laterally extending structure connecting said implement with the wagon, a draft link directly connecting the tractor and the laterally extending structure, a movable extension carried by said structure and connected with said wagon, and releasable friction controlled means cooperating with said extension to transmit draft to the wagon with limited slippage during acceleration.

10. In combination, a tractor, an agricultural machine, a wagon, means for drawing said machine and wagon by said tractor, said means including a hitch bar having one end connected to said machine, a draw bar having its forward end connected with said tractor and its rear end connected with said hitch bar at a substantial distance from both ends, a conveyor carried by said machine and adapted to transfer material from said machine to said wagon, means including a member engaging said hitch bar and wagon for changing the relative positions of said conveyor and wagon for loading different portions of said wagon, said last named means being operative during the continued movement of said tractor, and means including a part releasable by the operator on said tractor for controlling said last named means.

11. In combination, a tractor, an agricultural machine, a wagon, means for propelling said machine and wagon by said tractor, said means including a draft transmitting member extending transversely and forwardly and having one end connected with said machine and a second draft transmitting member separately connected with the tractor and said first member intermediate the ends of the latter, a rotatable drum journaled on one of said members, a flexible draft transmitting element connected with the wagon and having a portion looped around said drum, and brake means for controlling the rotation of said drum for changing the relative positions of said machine and wagon, said brake means being operative to control the rotation of said drum during the continued movement of said tractor.

12. A draft connection between a tractor and an agricultural implement and a vehicle disposed at one side thereof, comprising means connecting the tractor with the implement, a generally laterally extending structure connecting said implement with the vehicle, and means including relatively releasable frictionally engaging elements operatively connecting the laterally extending structure with the vehicle for transmitting draft directly thereto with limited slippage during acceleration and operable when released to disconnect the wagon from said structure whereby the wagon may drop behind during continued movement of the tractor and implement.

13. In a wagon hitch, a hitch bar having one end connected with and carried by a farm implement, a drawbar secured to said hitch bar between the ends thereof, a winding drum, means for mounting said drum on one of said bars, a cable attached to said drum and adapted to be wound thereon, the free end of said cable being adapted to be attached to a vehicle for drawing the same, means for adjustably holding said drum at any angularly adjusted position, and means for releasing said holding means to provide for free rotation of said drum.

14. A draft connection between a tractor and an agricultural implement and a vehicle disposed at one side thereof, comprising means connecting the tractor with the implement, a generally laterally extending structure connecting said implement with the vehicle, one end being arranged to react against the implement, draft means connecting said laterally extending structure intermediate its ends with the tractor, and means including relatively releasable frictionally engaging elements operatively connecting the other end of the laterally extending structure with the vehicle for transmitting draft directly thereto and means holding said elements in frictional engagement for limited slippage during acceleration, said elements being releasable to disconnect the wagon from said structure whereby the wagon may drop behind during continued movement of the tractor and implement.

15. In combination, a tractor, an agricultural implement adapted to be propelled by the tractor, a vehicle also adapted to be propelled by said tractor, a draft connection between said tractor and the vehicle and arranged to transmit draft to said vehicle, said draft connection including relatively releasable frictionally engaging elements through which the draft is transmitted, having limited slippage during acceleration and operable when released to disconnect the vehicle from the tractor, whereby the vehicle may be dropped behind relative to the implement during continued movement of the tractor.

In witness whereof, we hereunto subscribe our names this 12 day of December, 1931.

HIRAM L. BAKER.
MERVIN R. BAKER.